United States Patent

Shirai

[19]

[11] Patent Number: 6,125,968
[45] Date of Patent: Oct. 3, 2000

[54] LUBRICATING OIL SUPPLY SYSTEM FOR A ROLLING GUIDE APPARATUS

[75] Inventor: Takeki Shirai, Tokyo, Japan

[73] Assignee: THK Co., Ltd., Tokyo, Japan

[21] Appl. No.: 08/982,399

[22] Filed: Dec. 2, 1997

[30] Foreign Application Priority Data

Dec. 9, 1996 [JP] Japan .................................... 8-328881

[51] Int. Cl.$^7$ ............................ F16C 17/00; F16C 29/06
[52] U.S. Cl. ............................... 184/5; 184/65; 184/100; 184/102; 384/13; 384/45
[58] Field of Search .................. 184/5, 16, 22, 184/65, 87, 100, 102; 384/13, 45

[56] References Cited

U.S. PATENT DOCUMENTS

| | | | |
|---|---|---|---|
| 1,938,786 | 12/1933 | Vancil | 184/5 |
| 3,669,204 | 6/1972 | Andrews | 184/106 |
| 4,175,642 | 11/1979 | Bianchi et al. | 184/1 E |
| 4,350,105 | 9/1982 | Albrecht et al. | 184/6.15 |
| 5,050,707 | 9/1991 | Wilhelmsen | 184/87 |
| 5,399,023 | 3/1995 | Winkelmann et al. | 384/13 |
| 5,435,649 | 7/1995 | Kuwahara | 384/13 |
| 5,547,285 | 8/1996 | Hutzel et al. | 384/15 |
| 5,582,486 | 12/1996 | Tsukada | 384/13 |
| 5,845,996 | 12/1998 | Greubel et al. | 384/45 |

FOREIGN PATENT DOCUMENTS 5-71443   9/1993   Japan .

*Primary Examiner*—David Fenstermacher
*Attorney, Agent, or Firm*—Arent Fox Kintner Plotkin & Kahn, PLLC

[57] ABSTRACT

The present invention relates to a lubricating oil supply system provided in a rolling guide apparatus with which a track shaft and a slide member are engaged through a rolling element such as a ball or a roller, and lubricating a rolling surface of the rolling element formed on the rolling element or the track shaft, and more particularly to an improvement for securely performing a lubrication of the rolling guide apparatus by a simple and inexpensive structure. The lubricating oil supply system comprises a supply member impregnating the lubricating oil, fixed to the slide member and applying the lubricating oil with respect to the rolling surface of the rolling element or the track shaft together with a motion of the slide member, a reservoir tank receiving the lubricating oil and mounted to the movable element, and a supply tube having a fiber entangling element therewithin and introducing the lubricating oil within the reservoir tank to the supply member.

6 Claims, 7 Drawing Sheets

LUBRICATING OIL SUPPLY SYSTEM FOR A ROLLING GUIDE APPARATUS

FIELD OF THE INVENTION AND RELATED ART STATEMENT

The present invention relates to a lubricating oil supply system provided in a rolling guide apparatus with which a track shaft and a slide member are engaged through a rolling element such as a ball or a roller, and lubricating a rolling surface of the rolling element formed on the rolling element or the track shaft, and more particularly to an improvement for securely performing a lubrication of the rolling guide apparatus by a simple and inexpensive structure.

Conventionally, as a rolling guide apparatus of this type, there has been known a linear sliding apparatus used for a linear guide portion of a machine tool or a transfer apparatus and guiding a movable element such as a table on a fixed portion such as a bed or a saddle, and a ball thread apparatus used together with the linear slide apparatus and applying a stroke of a linear motion in accordance with a rotation amount of a motor to the movable element.

The former linear slide apparatus comprises a track rail disposed on the fixed portion and having a ball rolling groove formed along a longitudinal direction, a load rolling groove opposing to the rolling groove of the track rail through a multiplicity of balls, and a slide table having a ball endless circulating path rolling in the load rolling groove formed, in which the slide table supporting the movable element continuously performs a linear motion along the track rail.

On the contrary, the latter ball thread apparatus comprises a thread shaft having a spiral ball rolling groove formed at a predetermined lead, a load rolling groove opposed to the ball rolling groove through a multiplicity of balls and a nut member having a ball endless circulation path rolling in the load rolling groove, in which the ball circulates within the endless circulating path together with a relative rotation between the thread shaft and the nut member and the nut member continuously moves to an axial direction of the thread shaft.

In this case, when the rolling guide apparatus mentioned above is used, it is necessary to prevent an abrasion of the ball itself and an abrasion of the track rail or the rolling groove of the thread shaft (hereinafter, referred to as the track shaft) in which the ball rolls, or an abrasion of the load rolling groove of the nut member or the slide table (hereinafter referred to as the slide member), and to favorably lubricate the ball and the load rolling groove.

As a lubricating method mentioned above, in the conventional art, there has been known a manual oil supply method for supplying an oil within the slide member by using a grease gun, and a forcible oil supply method previously connecting a pipe for supplying an oil to the slide member and forcibly supplying a constant amount of lubricating oil at a constant interval by using an automatic pump. Further, in a recent year, there has been known a fog lubrication method for pressing and feeding an atomized lubricating oil together with high pressure air through an oil supply pipe connected to the slide member.

However, in the above manual oil supply method, a periodical oil supply operation in correspondence to the moving distance of the slide member is indispensable, and in the case that the moving distance of the slide member per a unit time is long, a frequent oil supply operation is necessary. Accordingly, there has been a problem that the above operation is troublesome.

On the contrary, in the forcible oil supply method and the fog lubrication method mentioned above, since the oil supply pipe is connected to the slide member in a fixed manner so that the supply of the lubricating oil is automatically performed, there is no trouble in the manual oil supply method mentioned above, however, the automatic pump for periodically supplying the lubricating oil and the pump for producing the high pressure air are necessary. Accordingly, there has been a problem that the structure of the apparatus becomes complex and the cost thereof is increased.

Further, in the manual oil supply method, a timing of the oil supply operation can be guessed with reference to a lubrication state of the rolling groove of the track shaft so that there is hardly a fear that the grease is wastefully consumed. However, in the forcible lubrication method or the fog lubrication method, since the predetermined amount is quantitatively supplied to the slide member with no relation to the actual consumption amount of the lubricating oil, the lubricating oil is wastefully consumed, so that there has been a problem that the cost for maintaining the rolling guide apparatus is increased.

OBJECT AND SUMMARY OF THE INVENTION

The present invention is made by taking the above described problems into consideration and an object of the invention is to provide a lubricating oil supply system capable of performing a lubrication of a rolling guide apparatus with a simple and inexpensive structure, and capable of reducing a cost for operating the rolling guide apparatus with restricting an amount of consumption of the lubricating oil.

Accordingly, in accordance with the invention, there is provided a lubricating oil supply system having a track shaft and a slide member engaging therewith through a rolling element, provided in a rolling guide apparatus for guiding a movable element fixed to the slide member along the track shaft and lubricating a rolling surface of the rolling element or a rolling element formed on the track shaft, comprising a supply member impregnated with the lubricating oil, fixed to the slide member and applying the lubricating oil on the rolling surface of the rolling element or the track shaft together with a motion of the slide member, a reservoir tank receiving the lubricating oil and mounted to the movable element, and a supply tube having a fiber entangling element therewithin and introducing the lubricating oil within the reservoir tank to the supply member.

In accordance with the technical means mentioned above, when the supply member impregnated with lubricating oil is applied to the track shaft together with the motion of the slide member, the lubricating oil corresponding to the amount of the consumed lubricating oil is supplied to the supply member from the reservoir tank mounted to the movable element through the supply tube.

At this time, since the supply tube is filled with the fiber entangling element therewithin, even in the case that the reservoir tank is disposed above the supply member fixed to the slide member, the lubricating oil within the reservoir tank is gradually supplied to the supply member little by little, so that an amount of the lubricating oil impregnated in the supply member can be always kept an appropriate value.

Further, even in the case that the reservoir tank is positioned at a level equal to or a little lower than the level of the supply member, since the lubricating oil within the reservoir tank is sucked up little by little to the supply member within the supply tube by a capillarity of the fiber entangling element, with regard to a little amount of lubricating oil consumed by application, the lubricating oil can be supplied to the supply member without using the pressing and feeding means such as a pump.

Accordingly, in accordance with the lubricating oil supply system of the invention, even when the lubricating oil is received within the reservoir tank, the lubrication of the rolling surface of the rolling element or the track shaft of the rolling guide apparatus can be securely performed without using a special machine tool such as a pump, thereby simply and inexpensively performing the lubrication.

At a time of realizing the lubricating oil supply system in accordance with the invention, it is preferable that the supply tube is structured in such a manner as to be freely attached and detached to (i.e., detachable from) the reservoir tank, and the reservoir tank is structured in such a manner as to be freely attached and detached to (i.e., detachable from) the movable element. When the reservoir tank and the supply tube are structured in the above manner, in the case that the reservoir tank becomes empty due to the consumption of the lubricating oil, all the reservoir tank is replaced so as to supply the lubricating oil, so that the trouble due to the oil supply of the lubricating oil to the emptied reservoir tank can be omitted.

Further, in accordance with the invention, since the reservoir tank is mounted to the movable element moving along the track shaft of the rolling guide apparatus, when the movable element is operated, the lubricating oil within the reservoir tank is hard stirred within the tank so as to bubble, so that there is a fear that the lubricating oil does not smoothly flow within the supply tube. Accordingly, in view of preventing such a stirring, it is preferable that an occluding element of the lubricating oil made of felt or polyurethane is received within the reservoir tank and the occluding element is impregnated by the lubricating oil.

The amount of the lubricating oil supplied to the supply member from the reservoir tank per a unit time is effected by the influence of a difference of a mounting height between both members, a thickness of the supply tube and a viscosity of the lubricating oil, however, in the case that the amount of the lubricating oil necessary for lubricating the track shaft is less than the supply amount of the lubricating oil to the supply member, the lubricating oil more than the necessary amount is applied to the track shaft as a result, so that there is a fear that the lubricating oil is wastefully consumed. Accordingly, in view of the above item, it is preferable that a flow amount control valve for controlling an amount of the lubricating oil supplied to the supply member from the reservoir tank is provided and only the lubricating oil necessary for lubricating the rolling surface of the track shaft is supplied to the supply member by controlling the flow amount of the lubricating oil within the supply tube by means of the flow amount control valve.

As mentioned above, in accordance with the lubricating oil supply system for the rolling guide apparatus of the invention, the lubricating oil of an amount substantially equal to the amount consumed in the supply member can be supplied to the supply member from the reservoir tank without using the pressing and feeding means such as the pump, so that the lubrication of the rolling guide apparatus can be performed by the simple and inexpensive structure.

Further, since the supply member applies the lubricating oil to the rolling element or the track shaft, a large amount of lubricating oil more than the necessary amount is not consumed, so that the consumed amount of the lubricating oil can be reduced.

DETAILED DESCRIPTION OF THE PREFERRED EMBODIMENTS

A lubricating oil supply system for a rolling guide apparatus in accordance with the invention will be described below with reference to the attached drawings.

Figure 1:
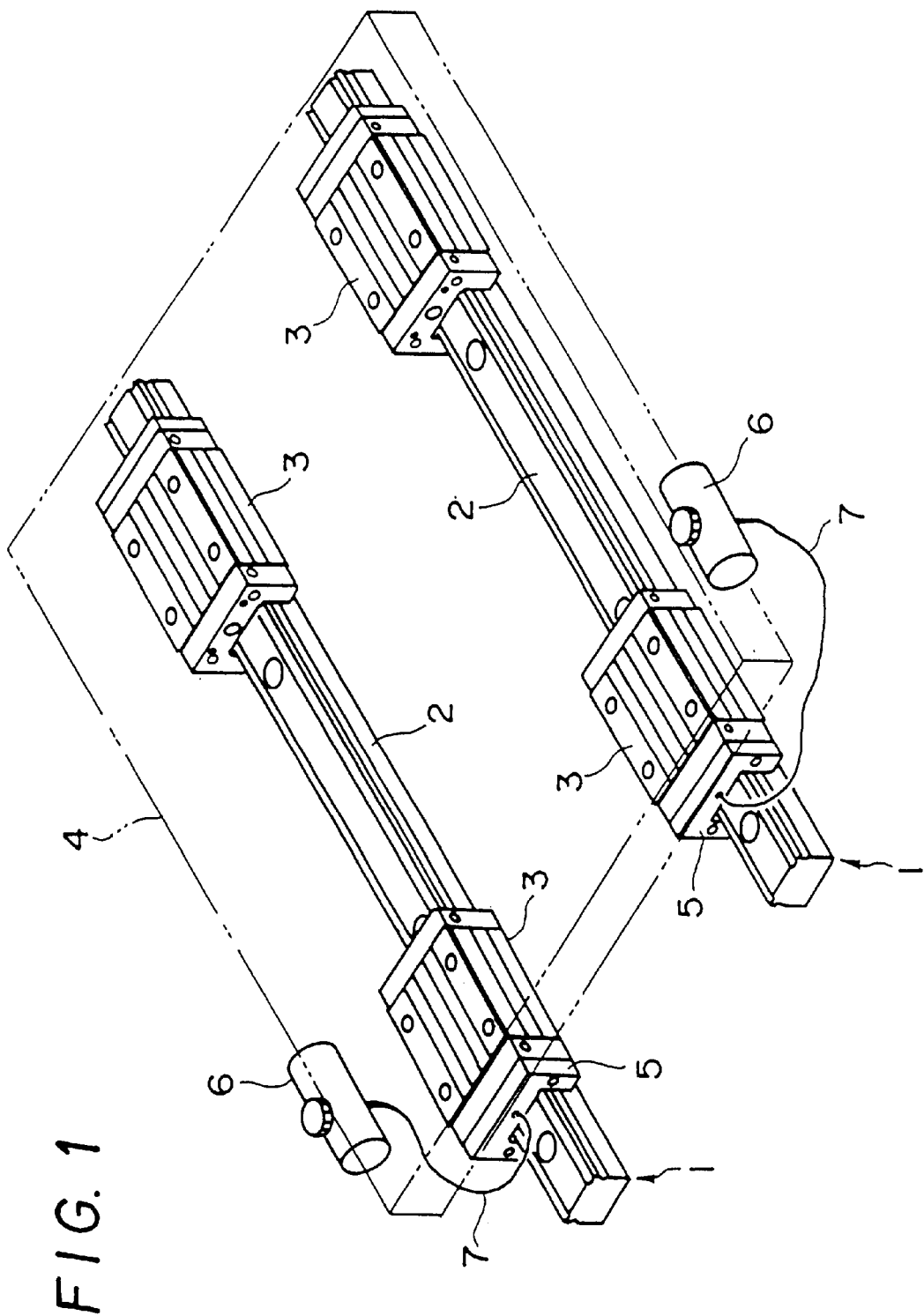
FIG. 1 is a perspective view which shows a first embodiment of a lubricating oil supply system in accordance with the invention.

FIG. 1 shows a first embodiment in which a lubricating oil supply system of the invention is applied to a linear slide apparatus. In the drawing, reference numeral 1 denotes a linear slide apparatus (a rolling guide apparatus), which is constructed by a track rail (a track shaft) 2 fixed to a fixed portion (not shown) such as a bed or a saddle and a slide table (a slide member) 3 engaging with the track rail 2 through a multiplicity of balls and moving along the track rail 2. Further, reference numeral 4 denotes a movable element such as a table fixed to the slide table 3. In the present embodiment, the motion of the movable element 4 on the fixed portion is supported by two track rails 2 and four slide tables 3 each two of which are engaged with each of the track rails 2.

Further, reference numeral 5 denotes a supply member fixed to an end portion of the slide table 3 in the moving direction and applying the lubricating oil to the track rail 2 together with the motion of the slide table 3, reference numeral 6 denotes a reservoir tank receiving the lubricating oil to be supplied to the linear slide apparatus 1 and mounted to the movable element 4, and reference numeral 7 denotes a supply tube for supplying the lubricating oil to the supply member 5 from the reservoir tank 6.

Figure 2:
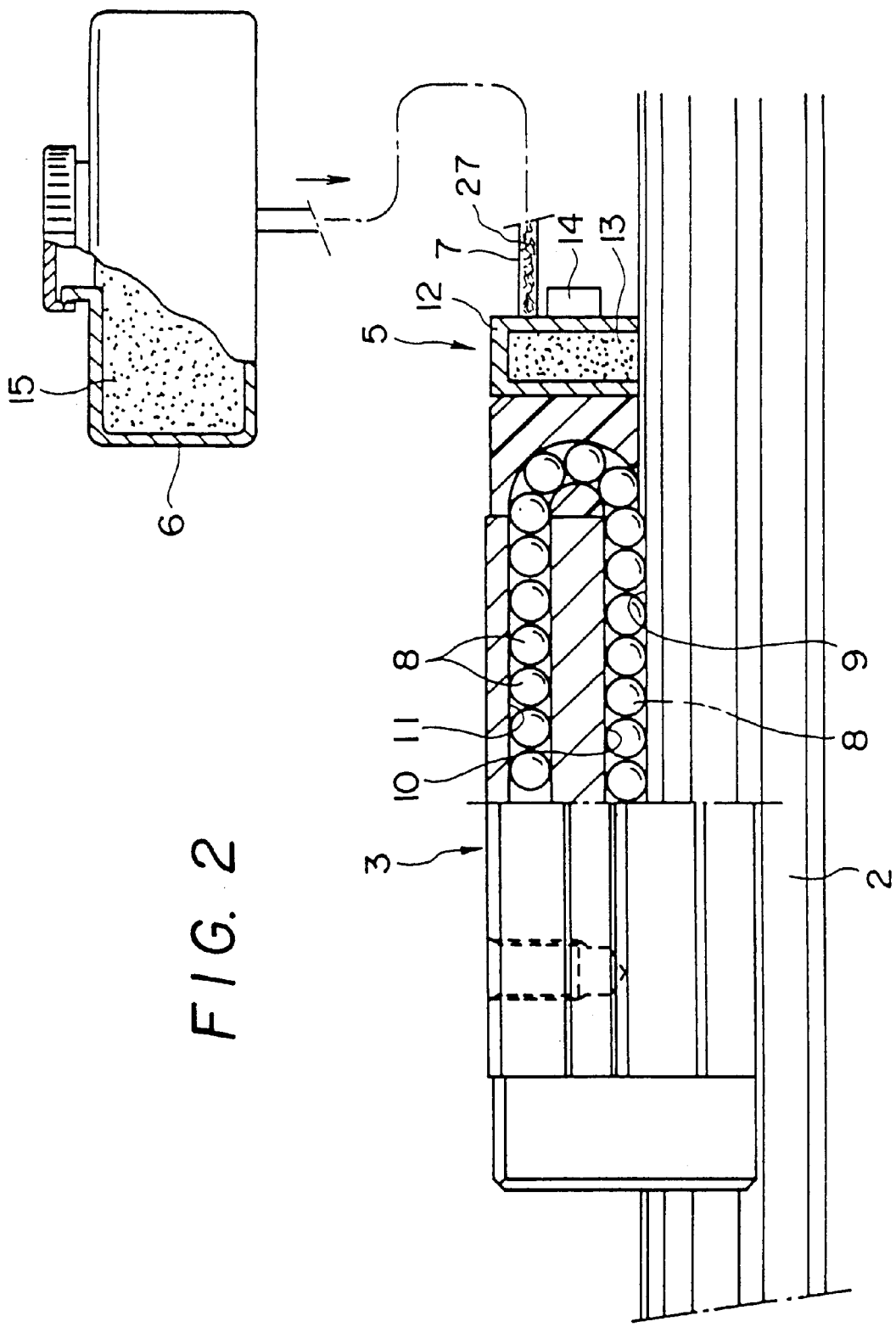
FIG. 2 is a cross sectional view which shows a state of connecting between a supply member and a reservoir tank in accordance with the first embodiment.

As shown in FIG. 2, a rolling groove 9 on which a ball 8 rolls is formed in the track table 2, and on the contrary, a load rolling groove 10 opposed to the ball rolling groove 9 of the track rail 2 is formed in the slide table 3, so that the ball 8 rolls between the rolling groove 9 and the load rolling groove 10 with applying the load. Further, an endless circulating path 11 for returning the ball 8 finally rolling to a final end of the load rolling groove 10 to a start end of the load rolling groove 10 is formed in the slide table 3, so that the slide table 3 can continuously move on the track rail 2 so that the ball 8 circulates within the endless circulating path 11.

On the contrary, the supply member 5 is formed as a box-like shape having a space therewithin, and the space is constituted by a casing 12 opened with facing the track rail 2 and a lubricating oil holding element 13 received within the casing 12 so as to be brought into contact with the track rail 2 and impregnate the rail with lubricating oil, and the supply member 5 is fixed to the end surface of the slide table 3 in the moving direction by a fixing bolt 14 extending through the casing 12. The lubricating oil holding element 13 is sufficient, so long as it can absorb and hold a certain amount of lubricating oil, and a polyurethane and a felt material can be used.

Accordingly, when the slide table 3 moves along the track rail 2, the lubricating oil holding element 13 brought into contact with the track rail 2 wipes the track rail 2, so that the lubricating oil impregnated in the lubricating oil holding element 13 is applied to the ball rolling groove 9 of the track rail 2, so that the ball 8 rolling on the ball rolling groove 9 is lubricated.

Further, the supply member 5 is connected to the reservoir tank 6 mounted to the movable element 4 through the supply tube 7, so that the lubricating oil stored within the reservoir tank 6 is absorbed by the lubricating oil holding element 13 within the supply member 5 through the supply tube 7. A fiber entangling element 27 such as a felt is inserted into the supply tube 7, so that the lubricating oil within the reservoir tank 6 does not flow into the supply member 5 at a stroke, but is fed to the supply member 5 while being absorbed by the fiber entangling element.

Further, the supply tube 7 is freely attached to and detached from the supply member 5 and the reservoir tank 6, as long as the lubricating oil impregnates the lubricating oil holding member 13, even at a time of removing the supply tube 7, the supply member 5 can lubricate the ball rolling groove 9 of the track rail 2.

On the contrary, a lubricating oil impregnating element 15 made of a felt material is inserted into the reservoir tank 6, and the lubricating oil is stored within the reservoir tank 6 in a state of being held in the impregnating element 15. Since the reservoir tank 6 is mounted to the movable element 4, when the lubricating oil is directly stored within the tank 6, the lubricating oil within the reservoir tank 6 is stirred together by high speed oscillation of the movable element 4 so that there is a risk of bubbling the lubricating oil. However, when the lubricating oil absorbed by the impregnating element 15 is stored within the reservoir tank 6, the above problems can be avoided.

Figure 3:
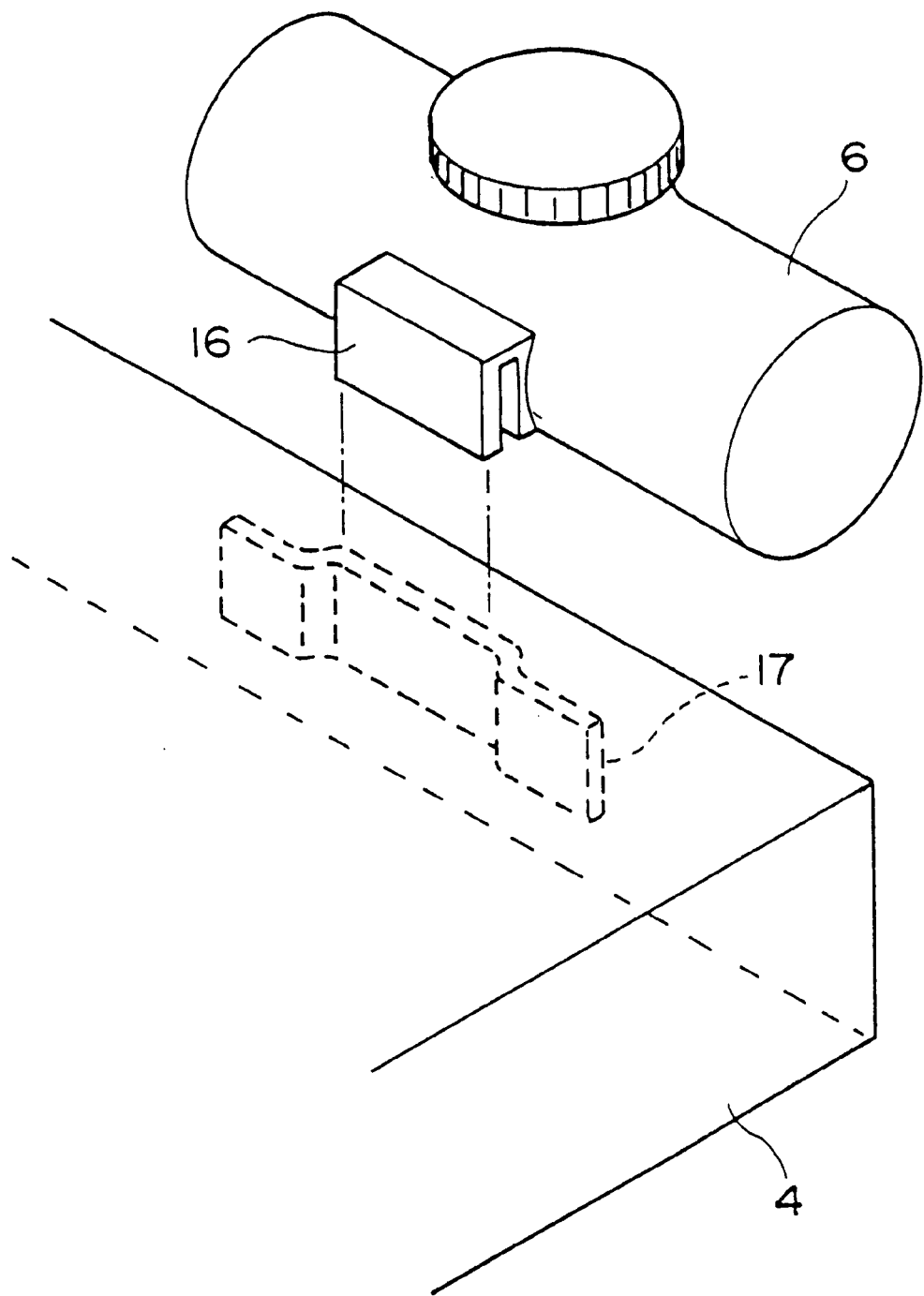
FIG. 3 is an exploded perspective view which shows a state of mounting the reservoir tank to a movable element in accordance with the first embodiment.

As shown in FIG. 3, a hook-like mounting portion 16 is projected in the back surface of the reservoir tank 6, so that the reservoir tank 6 can be fixed to the movable element 4 by hanging the mounting portion 16 on a holder 17 fixed to the movable element 4. Accordingly, the reservoir tank 6 can be freely attached to and detached from the movable element 4, and in the case that the lubricating oil within the reservoir tank 6 is used up, anew reservoir tank 6 storing the lubricating oil is remounted to the holder 17 and the supply tube 7 is reconnected to the new tank from the old tank, so that the lubricating oil can be easily supplied. In this embodiment, the reservoir tank 6 is mounted to the side surface of the movable element 4, however, as long as it does not disturb the equipment disposed in the periphery of the movable element 4, the reservoir tank 6 can be mounted to the upper surface or the lower surface of the movable element 4.

Further, in accordance with the lubricating oil supply system of the invention structured in the above manner, when the slide table 3 of the linear slide apparatus 1 moves together with the movable element 4, the supply member 5 wipes the track rail 2 by the lubricating oil holding element 13 together with the motion, so that the ball rolling groove 9 and the ball 8 rolling thereon is lubricated by the lubricating oil impregnated in the lubricating oil holding element 13. The amount of the lubricating oil impregnated in the lubricating oil holding element 13 is gradually reduced by repeating the above motion, however, since the reservoir tank 6 is connected to the supply member 5 through the supply tube 7, the lubricating oil corresponding to the amount consumed by application to the track rail 2 is successively supplied from the reservoir tank 6.

At this time, since the fiber entangling element 27 is inserted into the supply tube, the lubricating oil within the reservoir tank 6 is fed to the supply member 5 with being absorbed by the fiber entangling element, and on the contrary, in the supply member 5, the lubricating oil corresponding to the consumed amount is absorbed from the fiber entangling element 27 of the supply tube 7 by the lubricating oil holding element 13. In this case, since the reservoir tank 6 is mounted to the movable element 4 supported by the slide table 3, there is almost no difference in height between the slide table 3 to which the supply member 5 is fixed and the reservoir tank 6, even in the case that reservoir tank 6 is slightly lower than the supply member 5, the lubricating oil within the reservoir tank 6 is sucked up a little by little by the capillarity of the fiber entangling element 27 within the supply tube 7.

In this case, in order to recognize what degree the lubricating oil can ascend within the supply tube 7 by capillarity, the inventor of this invention actually has performed an experiment. The supply tube 7 used for the experiment is made by inserting a jute band into a transparent tube made of vinyl material and having an inner diameter of about 3 mm, and the experiment is performed in such a manner that the lower end of the supply tube 7 being vertically hung down is soaked into the lubricating oil. As a result of this, it has been recognized that the lubricating oil impregnates to the jute band within the transparent tube, and ascends a distance of about 50 to 60 cm within the supply tube 7. Accordingly, in order to achieve the result of this experiment, even in the case that the supply member 5 is positioned about 50 to 60 cm above the reservoir tank 6, it has been recognized that the lubricating oil can be supplied to the supply member 5 rather than to the reservoir tank 6.

On the contrary, even when the reservoir tank 6 is disposed higher than the supply member 5, since the fiber entangling element 27 inserted into the supply tube 7 serves as a flow path resistance with respect to the flow of the lubricating oil, the lubricating oil within the reservoir tank 6 does not flow into the supply member 5 at a stroke due to the influence of the gravity, but the lubricating oil holding element 13 within the supply member 5 receives only the lubricating oil corresponding to the consumed degree from the supply tube 7.

Accordingly, in accordance with the present embodiment, without using a special mechanism such as a pump, the lubricating oil within the reservoir tank 6 can be fed to the supply member 5 at a degree corresponding to the consumed amount, so that the supply member 5 can continuously apply the lubricating oil to the track rail 2 until the lubricating oil stored within the reservoir tank 6 is used up.

Figure 4:
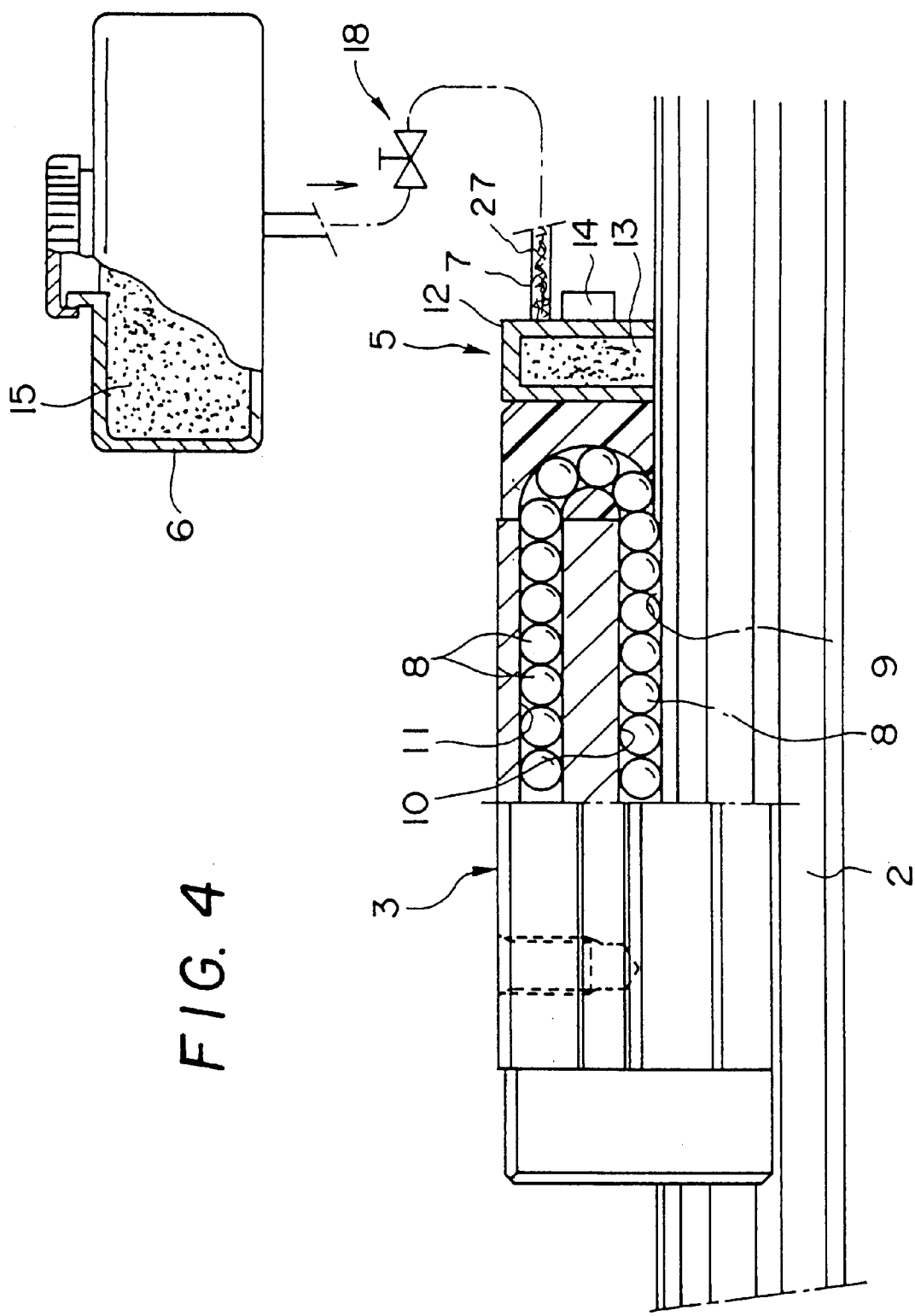
FIG. 4 is a cross sectional view which shows a second embodiment of a lubricating oil supply system in accordance with the invention.

On the contrary, FIG. 4 shows a second embodiment in which the lubricating oil supply system in accordance with the invention is applied to a linear slide apparatus.

In accordance with the lubricating oil supply system of the second embodiment, in order to control the flow amount of the lubricating oil fed to the supply member 5 from the reservoir tank 6, a flow amount control valve 18 is provided on the way of the supply tube 7 connecting between the reservoir tank 6 and the supply member 5, and the lubricating oil is prevented from being supplied to the supply member 5 more than the necessary amount by operating the flow amount control valve 18.

Figure 5:
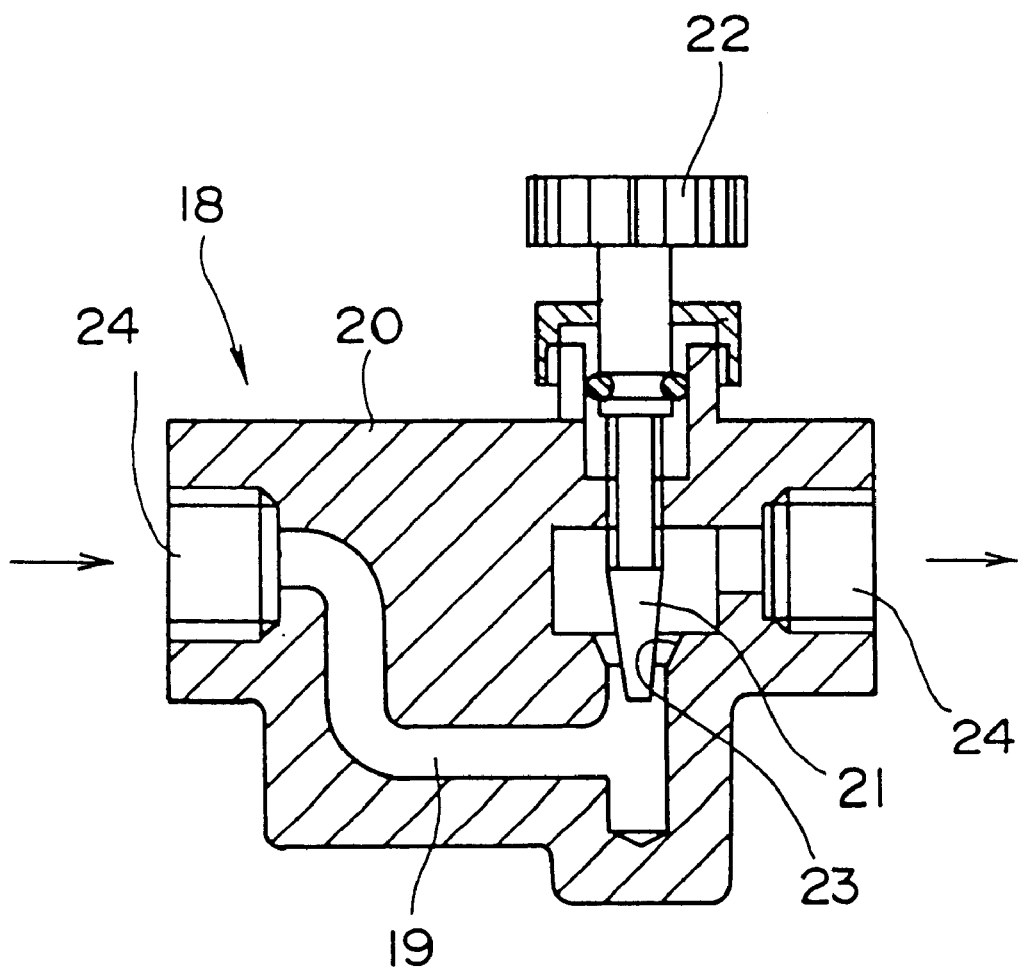
FIG. 5 is a cross sectional view which shows a flow control valve in accordance with the second embodiment.

The flow amount control valve 18 is, as shown in FIG. 5, constituted by a housing having a flow passage 19 for the lubricant oil formed, and a handle 22 meshed with the housing 20 and having a needle-like valve body 21 formed in a front end thereof, so that the valve body 21 is inserted into and out of a valve seat 23 provided on the way of the flow passage 19 by the operation of the handle 22, thereby controlling the flow amount of the lubricating oil flowing in the flow passage 19. In this case, reference numeral 24 in the drawing denotes a connecting port of the supply tube 7.

Then, in accordance with the lubricating oil supply system of the invention structured in the above manner, since the flow amount of the lubricating oil supplied to the supply member 5 from the reservoir tank 6 can be optionally adjusted by operating the flow amount control valve 18, an optimum amount of lubricating oil in correspondence to the usage of the linear slide apparatus can be applied to the ball rolling groove 9 of the track shaft 2 from the supply member.

In the second embodiment, it is structured such that the fiber entangling element such as a felt is not inserted into the inner portion of the flow passage 19 of the flow amount control valve 18 and the flow passage 19 is filled with only the lubricating oil, however, the structure can be made such that the fiber entangling element 27 is inserted into the flow passage 19 as well as the supply tube 7. In this case, the passing amount of the lubricant oil, that is, the supply amount is adjusted by crushing the fiber entangling element 27 within the flow passage 19 toward the valve seat 23 by means of the valve body 21 and changing the crush amount thereof.

Figure 6:
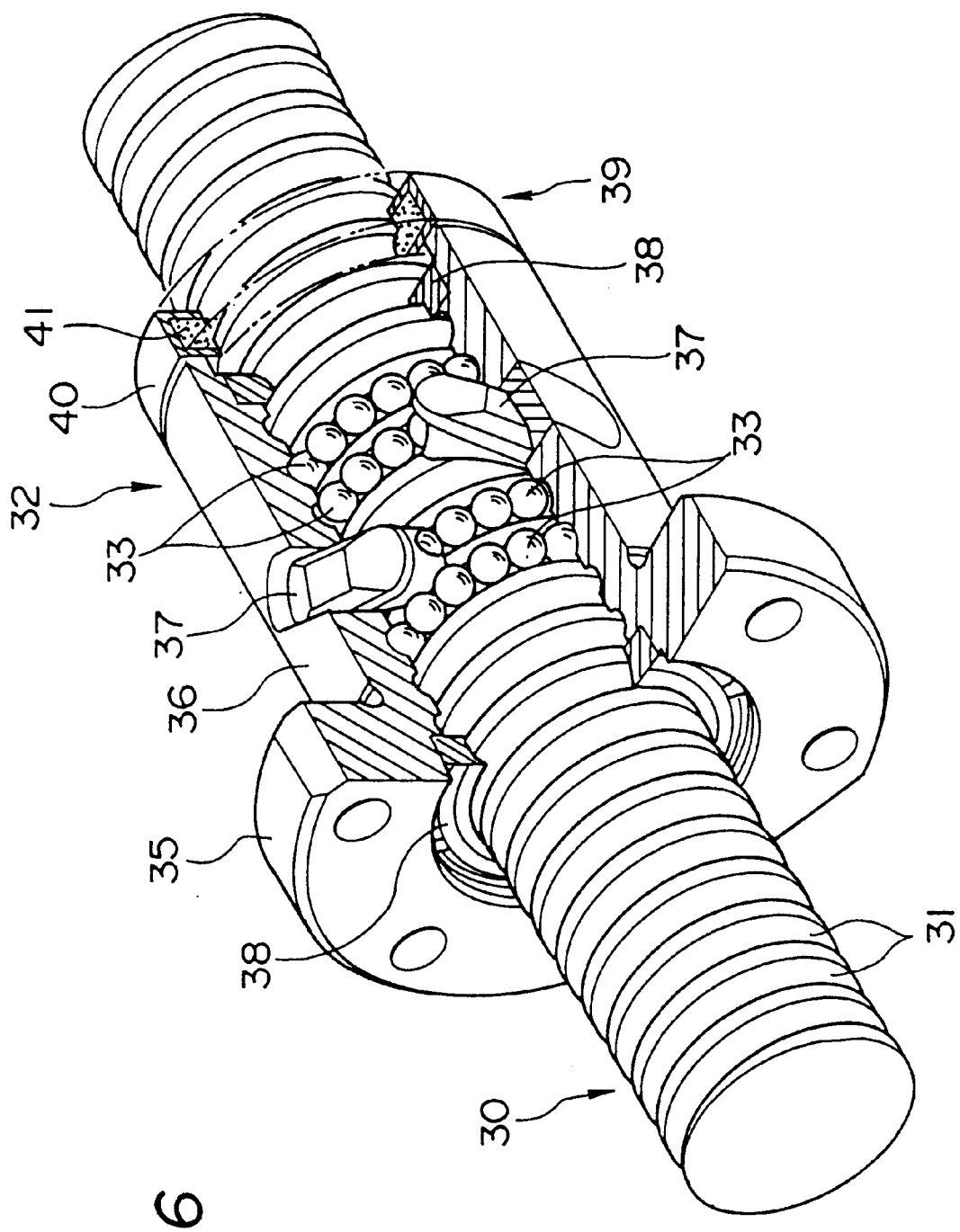
FIG. 6 is a perspective view which shows a third embodiment of a lubricating oil supply system in accordance with the invention.
Figure 7:
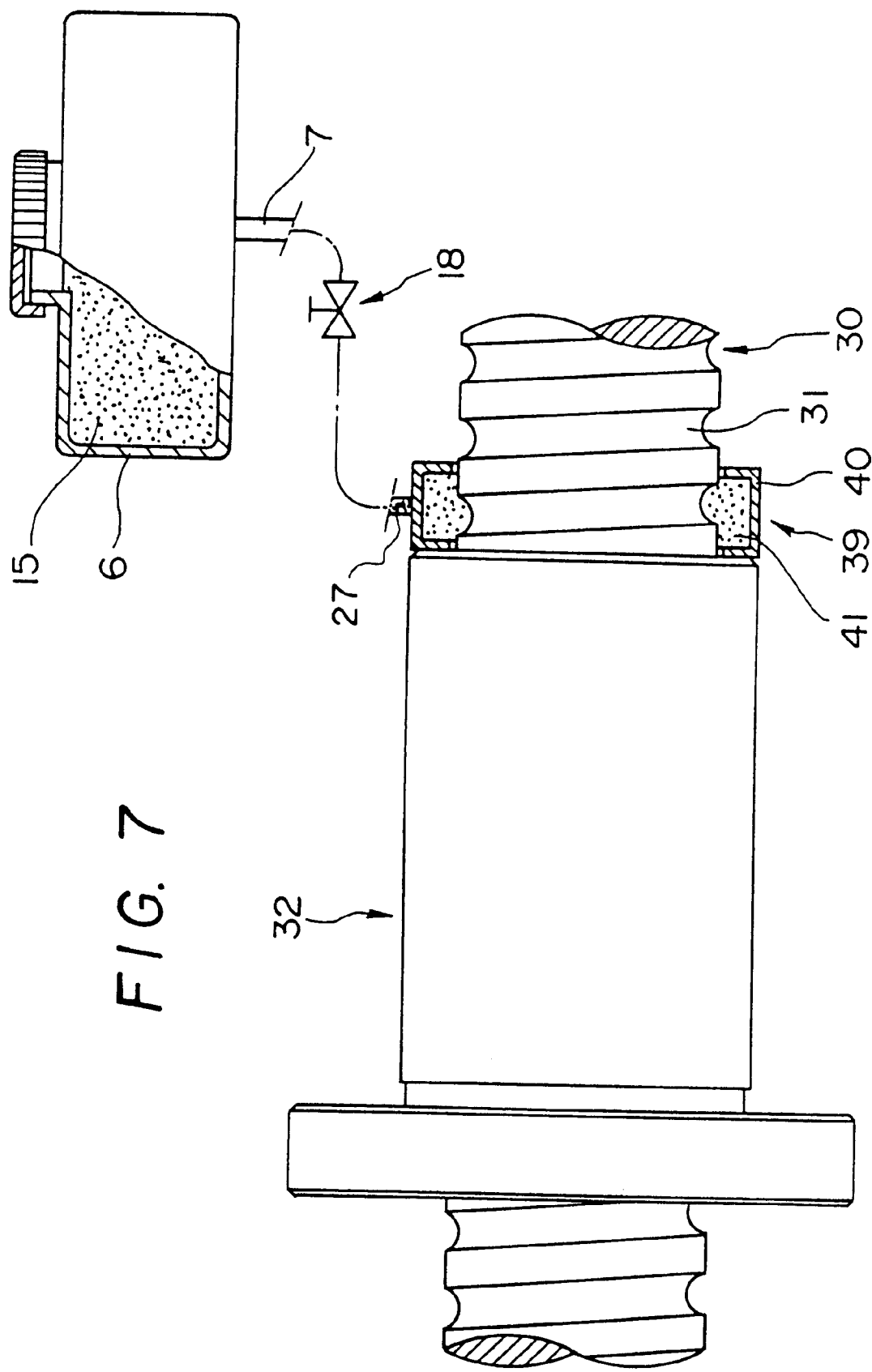
FIG. 7 is a cross sectional view which shows a state of connecting between a supply member and a reservoir tank in accordance with the third embodiment.

FIGS. 6 and 7 show a third embodiment in which the invention is applied to a ball thread apparatus.

In the drawing, reference numeral 30 denotes a thread shaft (a track shaft) having a spiral ball rolling groove 31 formed at a predetermined lead, reference numeral 32 denotes a nut member (a slide member) having an endless track on which a ball 33 circulates is meshed with the thread shaft 30 through the ball 33, and reference numeral 34 denotes a supply member mounted to both end surfaces of the nut member 32 in the longitudinal direction.

In this case, the nut member 32 is constituted by a steel nut body 36 provided with a flange portion 35 for fixing the nut member 32 in a projecting manner, a plurality of deflectors 37 fixed to an inner peripheral surface of the nut body 36, and a pair of seal members 38 for sealing a gap between the nut body and the thread shaft. The deflector 37 is fixed to the nut member 32 in such a manner as to jump over the ball rolling groove 31 of the thread shaft 30 only at a degree of a winding, so that the ball 33 rolling in the ball rolling groove 31 of the thread shaft 30 changes its direction by the deflector 37 and rides over the outer diameter of the thread shaft 30 so as to be returned to the ball rolling groove 31 in a winding prior state. Accordingly, the deflector 37 is structured such that the ball 33 is endlessly circulated within the inner portion of the nut member 32. Further, four deflectors 37 are fixed to the nut member 32 in the present embodiment in such a manner as to divide the circumference of a circle of the nut member 32 into four equal parts, so that the endless track of the ball 33 comprises all four tracks.

On the contrary, it is structured such that a supply member 39 receives a lubricating oil holding element 41 impregnating the lubricating oil within a casing 40 and the lubricating oil holding element 41 is brought into contact with the ball rolling groove 31 of the thread shaft 30, as in the same manner as the first embodiment. Further, the supply member 39 is fixed to the nut member 32 by the fastening bolt (not shown).

Further, as in the same manner as that in the first and second embodiments, the supply member 39 is connected to the reservoir tank 6 by the supply tube 7, and it is structured such that the lubricating oil within the reservoir tank 6 is supplied to the supply member 39 together with the reduction of the lubricating oil impregnated in the lubricating oil holding element 41. Since the structure of the reservoir tank 6, the supply tube 7 and the flow amount control valve 18 is the same as that of the first and second embodiments, the same reference numerals are attached to the same elements in the drawings, and the detailed description thereof is omitted.

In the lubricating oil supply system in accordance with the present embodiment structured in the above manner, when the thread shaft 30 and the nut member 32 of the ball thread apparatus are relatively rotated, the supply member 39 continuously applies the lubricating oil to the ball rolling groove 31 of the thread shaft 30 together with the rotation, so that the amount of the lubricating oil impregnated in the lubricating oil holding element 41 within the supply member 39 is gradually reduced. However, since the reservoir tank 6 is connected to the supply member 39 through the supply tube 7 and the fiber entangling element 27 is inserted into the supply tube 7, the lubricating oil is gradually fed to the supply member 39 from the reservoir tank 6 by a capillarity, so that without using the special mechanism such as the pump, the lubricating oil corresponding to the consumed amount can be successively supplied to the supply member 39 from the reservoir tank 6.

What is claimed is:

1. A lubricating oil supply system provided in a rolling guide apparatus having a track shaft and a slide member in engagement therewith through a rolling element for guiding a movable element fixed to the slide member along the track shaft, the lubricating oil supply system lubricating a surface of the track shaft and comprising:

a supply member including a casing and a lubricating oil holding element impregnated with a lubricating oil received in the casing, said supply member being fixed to said slide member and the lubricating oil holding element being in contact with and coating said lubricating oil on the surface of the track shaft in accordance with relative movement between the slide member and the track shaft;

a reservoir tank for holding said lubricating oil mounted to said movable element, said reservoir tank including an element for occluding said lubricating oil disposed within said reservoir tank and being impregnated by said lubricating oil; and a supply tube connected between said reservoir tank and said supply member and having a fiber entangling element therewithin, said fiber entangling element being in direct contact with both said lubricating oil holding element and said element for occluding said lubricating oil and thereby conducting said lubricating oil between said reservoir tank and said supply member.

2. A lubricating oil supply system for a rolling guide apparatus as recited in claim 1, wherein said supply tube is detachable from the reservoir tank and the reservoir tank is detachable from the movable element.

3. A lubricating oil supply system for a rolling guide apparatus as recited in claim 1, wherein the occluding element is made of felt impregnated by said lubricating oil.

4. A lubricating oil supply system for a rolling guide apparatus as recited in claim 1, wherein a flow amount control valve for controlling an amount of the lubricating oil supplied to the supply member from said reservoir tank is provided.

5. A lubricating oil supply system for a rolling guide apparatus as recited in claim 1, wherein said fiber entangling element comprises jute.

6. A lubricating oil supply system for a rolling guide apparatus as recited in claim 1, wherein said fiber entangling element comprises felt.

* * * * *